(12) United States Patent
Schrumpf et al.

(10) Patent No.: US 8,449,855 B2
(45) Date of Patent: May 28, 2013

(54) INORGANIC COMPOUNDS

(75) Inventors: Frank Schrumpf, Goslar (DE);
Wolfgang Kiliani, Laufenburg (DE);
Stefan Frässle, Murg (DE); Thomas Schmidt, Langelsheim (DE)

(73) Assignee: H.C. Starck GmbH & Co. KG (DE)

( * ) Notice: Subject to any disclaimer, the term of this patent is extended or adjusted under 35 U.S.C. 154(b) by 0 days.

(21) Appl. No.: 13/030,269

(22) Filed: Feb. 18, 2011

(65) Prior Publication Data

US 2011/0212330 A1    Sep. 1, 2011

Related U.S. Application Data

(63) Continuation of application No. 12/158,486, filed as application No. PCT/EP2006/011753 on Dec. 7, 2006, now abandoned.

(60) Provisional application No. 60/756,504, filed on Jan. 5, 2006.

(30) Foreign Application Priority Data

Dec. 20, 2005    (DE) .................... 10 2005 061 279

(51) Int. Cl.
*B22F 3/00* (2006.01)
*B32B 5/16* (2006.01)
*C01B 35/04* (2006.01)
*C04B 35/00* (2006.01)
*B05D 1/08* (2006.01)
*B05D 1/12* (2006.01)

(52) U.S. Cl.
USPC .......... 423/297; 428/402; 428/546; 501/96.3; 427/180; 427/446

(58) Field of Classification Search .................... None
See application file for complete search history.

(56) References Cited

U.S. PATENT DOCUMENTS

| 2,906,605 A | 9/1959 | Dubeck |
| 2,957,754 A | 10/1960 | Nicholson |
| 5,087,592 A | 2/1992 | Nadkarni |
| 5,169,832 A | 12/1992 | Khazai et al. |
| 7,731,776 B2 * | 6/2010 | Chun et al. ............. 75/244 |

FOREIGN PATENT DOCUMENTS

| EP | 0115702 A2 | 8/1984 |
| EP | 0232223 A2 | 8/1987 |
| EP | 0308014 A1 | 3/1989 |
| GB | 761311 | 11/1956 |

(Continued)

OTHER PUBLICATIONS

Kinoshita et al.; Zirconium Diboride as an Electrically Conductive Lattice-Matched Substrate for Gallium Nitride; Jpn. J. Appl. Phys, vol. 40, L1280-L1282; 2001.*

(Continued)

*Primary Examiner* — Melvin C Mayes
*Assistant Examiner* — Guinever Gregorio
(74) *Attorney, Agent, or Firm* — Novak Druce Connolly Bove + Quigg LLP

(57) ABSTRACT

The invention is related to a boride of a metal of transition group four of the periodic table of the elements, wherein at least 40 wt. % of the particles have a grain size of more than 106 μm, determined by sieve analysis according to ASTM B 214, and these particles consist of grown, monocrystalline grains. The invention also relates to a cermet, wettable powder and a surface coating which contain the boride. The invention further relates to a process to prepare the boride. The invention additionally relates to a process to prepare a cermet or a wettable powder.

22 Claims, 4 Drawing Sheets

FOREIGN PATENT DOCUMENTS

| | | |
|---|---|---|
| JP | 02080318 A | 3/1990 |
| JP | 05139725 A * | 6/1993 |
| JP | 2002187711 A | 7/2002 |
| JP | 2004099367 A | 4/2004 |
| WO | WO-97/08114 A1 | 3/1997 |
| WO | WO-2004/104242 A2 | 12/2004 |

OTHER PUBLICATIONS

Radev, D.D. "Properties of titanium and zirconium diborides obtained by conventional and nonconventional synthesis methods," Metal, 1996, vol. 50, pp. 561-564.

Zhao, H., et al., "Preparation of zirconium boride powder," Journal of the American Ceramic Society, 1995, vol. 78, No. 9, pp. 2534-2536.

"Standard test method for sieve analysis of metal powders, Designation: B 214-07", ASTM International, 2007, 4 pages.

"Standard test method for measuring abrasion using the dry sand/rubber wheel apparatus, Designation: G65-04," ASTM International, 2004, 12 pages.

Kinoshita et al., "Zirconium Diboride as an Electrically Conductive Lattice-Matched Substrate for Gallium Nitride", Jan. J. Appl. Phys., vol. 40, L1280-L1282, 2001.

* cited by examiner

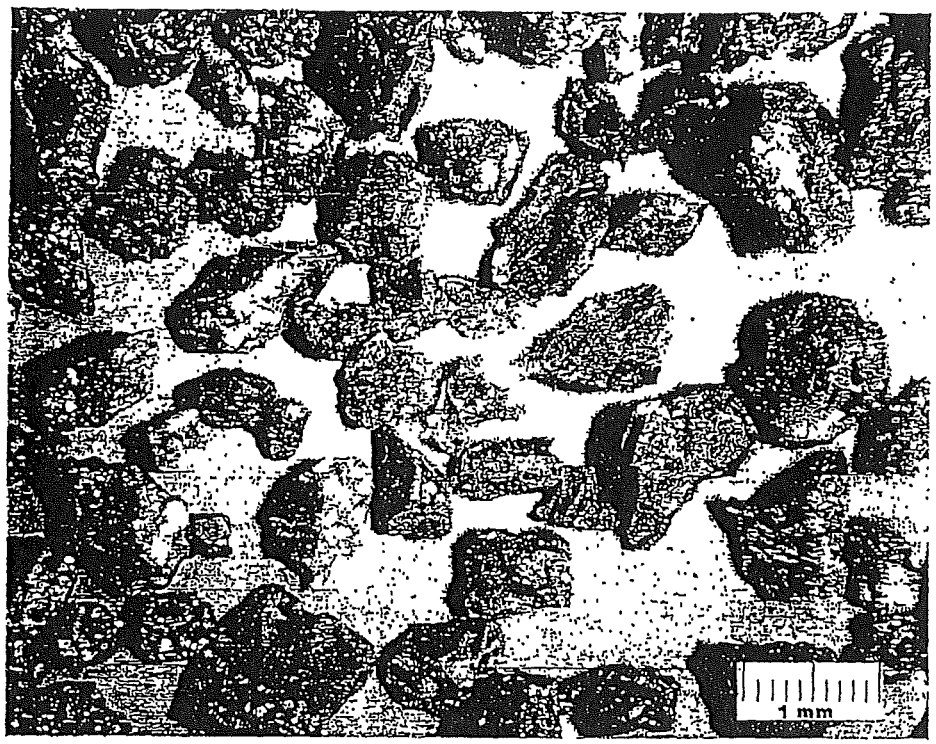
Figure 5
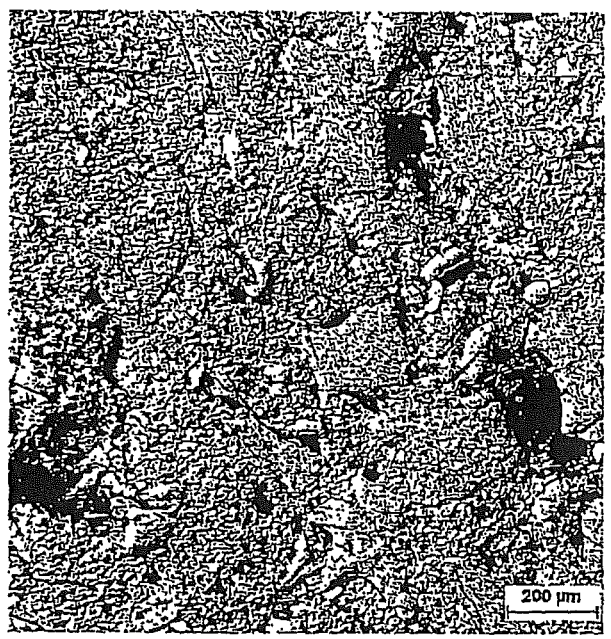
Figure 6, cermet B with TiB$_2$ according to Example 3

Figure 7, comparison cermet D with cast TiB$_2$

INORGANIC COMPOUNDS

RELATED APPLICATIONS

This application is a continuation of application Ser. No. 12/158,486 filed on Sep. 18, 2008, now abandoned which is incorporated by reference in its entirety for all useful purposes. Application Ser. No. 12/158,486 is a national stage application (under 35 U.S.C. §371) of PCT/EP2006/011753 filed Dec. 7, 2006, which claims benefit of German application 10 2005 061 279.2 filed Dec. 20, 2005 and U.S. Provisional Application 60/756,504 filed on Jan. 5, 2006.

The present invention relates to borides of metals of transition group four having a high content of monocrystalline, coarse powder particles with a volume of $>1.5*10^{-3}$ mm$^3$, the surfaces of the particles being smooth and glossy and the corners and edges of the particles being rounded.

Ceramics materials have been used for a long time to manufacture wear-resistant machine or apparatus parts.

The high hardness and strength of many ceramics, compared with metal materials, allow abrasive substances to be handled without rapid wear of the apparatus. Pipes or elbows, stirring devices, stirrer vessels, flow breakers, nozzles, balls in valves, punching, milling or cutting tools, sifter wheels or deflectors in mills are often manufactured entirely of ceramics or covered with ceramics tiles in order to extend the useful life of the parts in question.

In addition to the chemical composition of the ceramics material, the nature of the radiographic phases and the form of the crystals are also relevant to the physical properties of the structural or covering component to be manufactured. The hardness and strength of a material are essentially determined by the possibilities that a crack which forms has of penetrating into the particles and propagating.

One method of suppressing crack propagation is to produce the ceramics component from a large number of extremely fine crystals. As a result, a crack that forms is able to propagate over only a very short distance before it reaches a phase boundary and is accordingly prevented from propagating further. This method is carried out in the hard metal industry, for example, where particularly high hardnesses and strengths are achieved using very fine tungsten carbide having particle sizes below 1 μm, in particular below 0.5 μm, with cobalt as binder.

Another approach is to use monocrystalline materials. Because of the extremely high forces of attraction present in the ordered crystal between the electrically oppositely charged cations and anions, such a crystal—if defects in the lattice are avoided to the greatest possible extent—represents the optimum, maximum achievable hard phase of the chemical composition in question. This strategy is also known from metallurgy. For example, turbine blades for hot regions of gas turbines are manufactured in the casting process as monocrystalline components made from superalloys.

The preparation of monocrystalline particles by crystal growth has the additional advantage that, with controlled growth, smooth surfaces are usually formed which, with suitable process management, are largely free of defects. In comparison with polycrystalline-agglomerated particles or compared to glasses, such crystals exhibit more homogeneous surface structures. As a result of the smoother surface of the grown crystals, the number of superficial dislocations or other defects, which can act as starting points for cracks, is minimised. The term "monocrystalline" within the scope of the present patent specification is not to be understood as meaning the usual properties of a "monocrystal", such as "free of dislocations" or "untwinned", which are conventional among experts in crystallography/mineralogy. The term "monocrystalline" used here simply serves as a distinction with respect to particles "agglomerated from small crystals" or "obtained from a large cast block by breaking up and grinding". The term "monocrystalline" is accordingly to be understood as being a simplification of the description: "Particles which, starting from seed crystals, grow layer by layer in the reaction zone by the addition of material at atomic level and in the process lose specific surface area and accordingly surface energy."

Polycrystalline agglomerated or glass-like particles are generally obtained when ceramics melts are cooled and the resulting pieces, which are of large volume, are processed by breaking up, grinding and sieving to form powders. Such powders are recognisable by the sharp corners and edges of the particles. These sharp corners and edges are disadvantageous because they constitute sites of high surface energy, which likewise means that breaking and crack formation occur more readily.

The ceramics hard material "cast tungsten carbide", $W_2C$/WC, constitutes a combination of the advantages of both the strategies mentioned above. This material can be used in a finely crystalline modification which, owing to the fine crystals distributed in a feather-like manner, exhibits a high degree of hardness. This structure is obtained upon solidification from the melt. A disadvantage of this material is the sharp corners and edges which occur after grinding and sieving. Particularly high wear resistance is achieved with this material when the particles additionally have a spherical outer shape. This is achieved in the case of spherical cast tungsten carbide by melting again for a very short time. The spherical form makes it more difficult for a crack induced by pressure or stress to form or penetrate into the particles.

Also known are ceramics anti-wear coatings made of the material titanium boride, $TiB_2$. $TiB_2$ is a ceramics material which almost achieves the hardness of diamond, has a melting temperature of about 2900° C. and is electrically conductive and extremely chemically resistant. On account of its electrical conductivity, sintered parts of $TiB_2$ can be processed by electroabrasive processes to form complex components. The chemical reaction passivity allows molten metals, such as copper, aluminium or zinc, to be handled in apparatuses made of $TiB_2$.

$TiB_2$ is suitable as a conductive component in mixed ceramics together with boron nitride, in order to produce, for example, evaporator dishes for molten aluminium. The high corrosion resistance, in conjunction with the electrical conductivity, is used advantageously in this application.

It is also known to use $TiB_2$ as a constituent of particularly resistant components of ceramics or cermets. Powders that are very fine and have mean particle sizes $D_{50}$ of a few micrometres, in some cases even in the nanometre range, are generally used here. Coarse $TiB_2$ grains can be used for electrode coatings or as a substitute for the carbon electrode in aluminium electrolysis, because $TiB_2$ is wetted by liquid aluminium and the electrical resistance of the cell can be reduced. This use is described in European Patent EP-A-0232223. The preparation of $TiB_2$-containing composites for use in aluminium electrolysis cells is described, for example, in EP-A-0115702, EP-A-0308014 and WO 97/08114.

Titanium boride powder which has been prepared by breaking up, grinding and sieving cast titanium boride is available commercially. The particles have a size of approximately from 150 μm to over 1 mm. Microscope pictures clearly show the shell-like broken surface structure and the glass-like, sharp corners and edges of the particles (FIG. 5).

The rough surface reduces the wear resistance of the ceramics for the reasons described above.

U.S. Pat. No. 5,087,592 B describes a process in which a platelet-like $TiB_2$ can be prepared from $TiO_2$, carbon and $B_2O_3$ at temperatures of from 1600 to 1700° C. with the addition of alkali carbonate. The product consists of hexagonal platelets having a diameter of from 5 to 30 µm. Some of the platelets have sintered together to form larger agglomerates. These agglomerates are relatively soft, however, and, as is to be expected, break up relatively easily, for example when ground in a jet mill. Virtually no particles having sizes over 80 µm are present in the powder mixture.

The same is true of the other borides of the metals of transition group four (IVb) of the periodic table of the elements, that is to say titanium, zirconium and hafnium.

The object of the invention was to provide borides of the metals of transition group four (IVb) of the periodic table of the elements, which borides are in the form of a coarsely crystalline powder having smooth surfaces and rounded edges.

The production of an anti-wear ceramics based on this material would achieve a considerable qualitative advance as a result.

However, no processes have hitherto been known with which such borides can be produced on an industrial scale in the form of grown, crystalline powders having smooth surfaces and rounded edges. In particular, no processes are known with which coarse $TiB_2$ monocrystals having edge lengths markedly greater than 200 µm can be produced industrially and economically.

A further object of the invention was, therefore, to provide a process for the production of such materials.

BRIEF DESCRIPTION OF THE DRAWINGS

FIG. 5 is an SEM showing a commercially available TiB; and

FIGS. 6-7 are SEMs of hot-pressed cermets according to Example 5 and Comparison Example 4, respectively.

DETAILED DESCRIPTION

Figure 2:
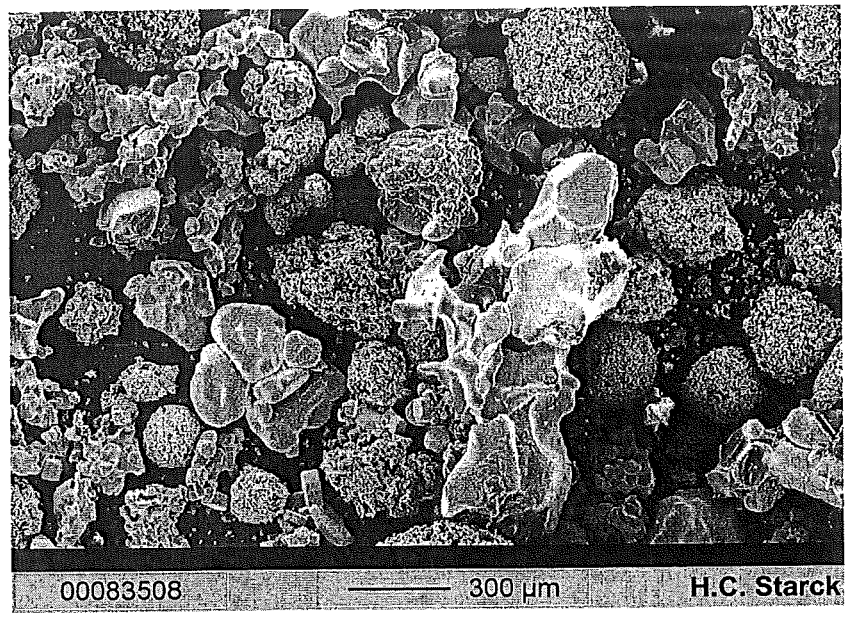
FIG. 2 is an SEM showing grains and raspberries from Example 1.

The objects of the present invention have been achieved by the provision of borides of metals of transition group four of the periodic table, wherein at least 55 wt. % of the particles have a grain size of more than 106 µm, determined by sieve analysis according to ASTM B 214, and these particles consist of grown, monocrystalline grains.

The borides according to the present invention are obtained by a process for the preparation of a boride of metals of transition group four by reacting boron carbide with at least one oxide of a metal of transition group four in the presence of carbon, wherein the reaction is carried out in the presence of an alkali or alkaline earth salt having a high boiling point of at least 1800° C., boron carbide is used in excess, and the reaction is carried out at a temperature of more than 2000° C.

The object of producing, at very high temperatures, a reaction atmosphere which allows the resulting boride of a metal of transition group four of the periodic table (in particular $TiB_2$) to form coarse crystals by Ostwald ripening was achieved by bringing the temperature of the reaction mixture close to the melting point of the boride of a metal of transition group four of the periodic table.

Only at sufficiently high temperatures above 2000° C., in particular 2400° C. and higher, does the boride have a sufficiently high vapour pressure which allows seed crystals and fine crystals that have formed temporarily to disappear again and grow onto coarser particles. At this high temperature, $B_2O_3$ and $B(OH)_3$ are not suitable as starting materials because both substances are too highly volatile and very high boron losses would therefore occur, which is disadvantageous. For this reason, boron carbide, $B_4C$, is used for the process according to the invention.

At least 40 wt. %, but advantageously up to 100 wt. %, in particular at least 55 wt. %, or from 50 wt. % to 90 wt. % or from 60 wt. % to 70 wt. %, of the particles of the boride according to the invention have a grain size of more than 106 µm. The grain size is determined by sieve analysis according to ASTM B 214. According to the invention, it is precisely these particles that must consist of grown, monocrystalline grains and may not consist of agglomerates of smaller individual grains, which are also referred to as "raspberries" on account of their raspberry-like appearance in microscopy. The proportion of raspberries according to the invention is advantageously less than 15%, or less than 10%. These raspberries occur in particular in the sieve fraction greater than 106 µm and consist of agglomerated primary crystals having a size of from 2 µm to 30 µm. Advantageously, less than 10% of these particles consist of raspberry-like agglomerated primary crystals having a size of from 2 µm to 30 µm.

Metals of transition group four of the periodic table of the elements are understood as being titanium, zirconium, hafnium or mixtures thereof. According to the invention, the borides of these metals, that is to say $TiB_2$, $ZrB_2$, $HfB_2$, can be obtained with the described properties. If a mixture of at least two oxides of different metals is used in the process according to the invention, then substitution mixed crystals can be obtained, the ratio of the metals to one another in the reaction mixture reflecting the ratios in the mixed crystal. The formula for the resulting boride is then $Ti_XZr_YHf_{1-X-Y}B_2$, wherein X and Y are less than 1 and the sum of all the metals is always 1.

Figure 4:
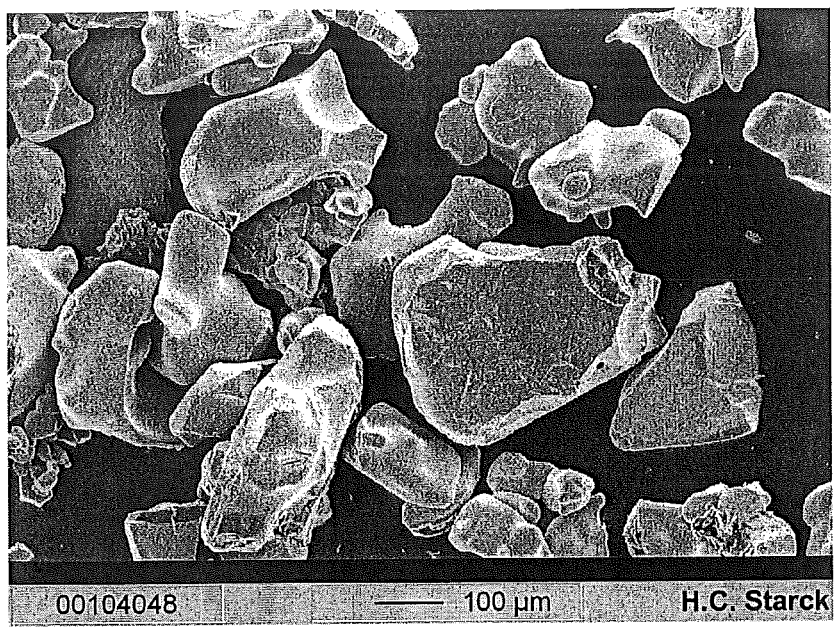
FIG. 4 is an SEM showing TiB, according to the invention.

In most cases, the sum of X and Y is already 1, so that mixed crystals only of titanium and zirconium boride are obtained. In particular, $TiB_2$ and $ZrB_2$ can advantageously be obtained according to the invention. The mean grain size of the sieve analysis according to ROTAP ASTM B 214 is from 100 µm to 500 µm or from 200 µm to 355 µm. The monocrystalline boride grains according to the invention can readily be distinguished by microscopy from conventional borides having sharp edges and a shell-like break, and can also readily be distinguished from the raspberries by their characteristic gloss in incident light, smooth surfaces and round corners and edges. FIG. 4 shows a $TiB_2$ according to the invention. FIG. 5 shows a commercially available $TiB_2$ according to the prior art. The borides according to the invention have a particle size distribution in which the $D_{10}$ value is from 2 µm to 50 µm, in particular from 10 µm to 35 µm or from 20 µm to 50 µm or from 30 µm to 45 µm; the $D_{50}$ value is from 4 µm to 300 µm, in particular from 200 µm to 300 µm or from 140 µm to 240 µm; the $D_{90}$ value is from 8 µm to 750 µm, in particular from 250 µm to 650 µm or from 300 to 600 µm or from 370 µm to 580 µm.

The process according to the invention is carried out at a temperature of approximately 2000° C. or more, advantageously at from approximately 2100° C. to approximately 2750° C., in particular at from approximately 2200° C. to 2650° C. or at from approximately 2400° C. to approximately 2600° C. or from approximately 2300° C. to approximately 2500° C. The temperature measurement is carried out by measuring the temperature of the surface of the reaction mixture through the waste gas opening in the lid of the crucible using a pyrometer, an emission factor of from approximately 0.3 to approximately 0.5 being expedient. The described temperatures were measured by means of a pyrometer at the surface of the reaction mixture and with an emission factor of 0.37.

In the process it is necessary to avoid melting of the reaction mixture because otherwise a solid block forms on solidification, which block can be broken up only under extreme mechanical forces and only into fragmented pieces with sharp corners and edges. This melting of the reaction mixture is observed at temperatures of about 2800° C. and above.

An alkali or alkaline earth metal salt is added during the process, which salt must not evaporate to an appreciable degree before or during the reaction. Therefore, this salt or salt mixture must have a boiling point of at least approximately 1800° C., advantageously at least approximately 1900° C., in particular from 2100° C. to 2750° C. or from 2200 to 2650° C. or from 2400 to 2600° C. or from 2300 to 2500° C. Oxides, hydroxides or carbonates of alkali or alkaline earth metals which have a sufficiently high boiling point are advantageous. Sodium oxide, which is used in U.S. Pat. No. 5,087,592 B, is poorly suitable owing to its boiling point of only about 1270° C. On the other hand, lithium oxide (boiling point>2100° C.), magnesium oxide (boiling point>3500° C.), calcium oxide (boiling point 2850° C.), calcium hydroxide and calcium carbonate in particular are highly suitable.

The alkali or alkaline earth metal salt reacts predominantly to form the borate, for example $CaBO_3$, which becomes concentrated in the form of a liquid phase at the grain boundaries of the intermediate phase between the monoxide of the metal of transition group four of the periodic table and the borate of the metal of transition group four of the periodic table (e.g. TiO and $TiBO_3$) and accelerates significantly the gas phase transport of the reactants below the melting temperature of the boride of the metal of transition group four of the periodic table. At the same time, a purification procedure for the growing boride of the metal of transition group four similar to zone refining takes place at the phase boundary. As a result, crystal growth is accelerated at the temperatures used in the process according to the invention, so that the proportion of crystals having a particle volume greater than $1.5*10^{-3}$ $mm^3$ in the unground reaction product can be increased to more than 50%.

As a result of the addition of the alkali or alkaline earth metal salt, the borides according to the invention have a low content of alkali or alkaline earth metal ions, which is less than 100 ppm, advantageously from 10 ppm to 90 ppm, in particular from 20 ppm to 50 ppm or from 30 ppm to 65 ppm.

Because these alkali or alkaline earth metal salts generally react under the reaction conditions to form the oxides of the alkali or alkaline earth metals in question, the boiling point of the oxides must lie within the same range as the abovementioned ranges for the boiling points of the salts used. The alkali or alkaline earth metal salt will be present in the reaction mixture in amounts of generally 1 wt. % or less, such as, for example, from 0.025 wt. % to 0.25 wt. %. Based on the use of calcium salts, amounts of from 0.03 wt. % to 0.1 wt. %, but also a calcium content of from 300 ppm to 900 ppm, yield good results.

The reaction is additionally carried out in the presence of carbon, because the carbon content of the boron carbide is not sufficient to reduce the oxide of the metal of transition group four of the periodic table of the elements. The carbon can generally be used in any commercially available form which has the necessary purity and particle size in order to be mixed with the other reactants and reacted under the reaction conditions. Examples which may be mentioned here include graphite, carbon black or coal dust. It is advantageous to use, for example, flame black, which has low heavy metal contents of each less than 10 ppm, which is advantageous.

In addition to the reactants already described, $B_2O_3$ or $B(OH)_3$ can be present in the reaction mixture in order to facilitate the start of the reaction. For example, from 0.4 wt. % to 2.5 wt. %, or from 0.42 wt. % to 2.46 wt. %, or from 0.7 wt. % to 1.65 wt. % $B_2O_3$ can be added. $B(OH)_3$ can also be used.

As the oxide of a metal of transition group four of the periodic table of the elements there can be used in principle any obtainable material, that is to say any oxide of titanium, zirconium or hafnium, in particular titanium dioxide or zirconium dioxide. These generally have BET surface areas of from 0.1 $m^2/g$ to 8 $m^2/g$, in particular from 1 $m^2/g$ to 6 $m^2/g$ or from 2 $m^2/g$ to 5 $m^2/g$ or from 3 $m^2/g$ to 4 $m^2/g$.

The required ratio of the starting materials does not correspond exactly to the reaction equation:

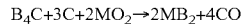

$$B_4C+3C+2MO_2 \rightarrow 2MB_2+4CO$$

(wherein M is at least one metal of transition group four of the periodic table, in particular Ti, Zr or Hf) because volatile boron compounds form as intermediates and escape from the reaction mixture with the CO waste gas. Boron carbide is therefore used in excess in respect of the abovementioned reaction equation. The excess of $B_4C$ necessary for a reaction that results in an economic yield of product is generally from 15 mol. % to 35 mol. % stoichiometric, based on the metal of transition group four of the periodic table. The reaction time is generally between 4 and 36 hours, in particular from 5 hours to 12 hours, or from 14 to 24 hours or from 16 to 22 hours or from 20 to 26 hours.

Owing to their coarse, smooth grains and their rounded edges, the borides according to the invention are particularly insensitive to mechanical, abrasive or impact stress, so that fragmentation or the breaking off of very small particles are rarely observed. Ceramics or cermets that comprise such borides according to the invention are therefore particularly wear- and impact-resistant. The present invention accordingly relates also to the use of borides according to the invention, in admixture with a metal binder component, in the production of cermets by hot pressing, high-temperature isostatic pressing or sintering.

The present invention relates further to the use of a boride according to the invention in the production of wettable powders for surface coating by plasma spraying, HVOF spraying or cold gas spraying, wherein the titanium boride is bonded to the surface in the form of a ceramics hard material in a metal binder component and, owing to its particularly smooth crystal surface and its particularly round corners and edges, brings about particularly preferred frictional, sliding and wear properties of the coating. The present invention relates in addition to a surface coating comprising a boride according to the invention. Such coatings can be applied by means of thermal spraying processes, such as, for example, plasma spraying, HVOF spraying or cold gas spraying, for which corresponding wettable powders are used. The present invention therefore relates also to wettable powders comprising a boride according to the invention and at least one metal powder as binder component. In addition, the present invention relates to cermets comprising a boride according to the invention, in particular comprising a titanium boride or zirconium boride according to the invention, in particular a titanium boride. Suitable metal binders are binder components comprising iron, copper, chromium, nickel, aluminium, yttrium, vanadium, rhenium or their alloys with one another or with other metals, such as, for example, steels, such as, for example, stainless steel, V4A steel, V2A steel, alloys known as MCrAlY or alloys marketed under the trade names Inconel® and Hastalloy®. These are mixed with one another in the form of powders in a ratio of from 90:10 to 10:90 or from 80:20 to 20:80 or from 70:30 to 30:70 or from 75:25 to 25:75 or from 60:40 to 40:60 or 50:50 (based on weight), pressed and sintered, yielding the cermets according to the invention.

A specific embodiment of the invention relates to a compound of formula $Ti_XZr_YHf_{1-X-Y}B_2$, wherein X and Y are less than 1 and the sum of all the metals is always 1, wherein from 50 wt. % to 100 wt. % of the particles have a grain size of more than 106 μm, determined by sieve analysis according to ASTM B 214, and these particles consist of grown, monocrystalline grains;
or
the sum of X and Y is 1;
or
the compound of formula $Ti_XZr_YHf_{1-X-Y}B_2$ is zirconium boride or titanium boride;
and/or
the proportion of raspberries is advantageously less than 15% according to the invention.

A further embodiment of the invention relates to zirconium boride or titanium boride, wherein the proportion of crystals having a particle volume greater than $1.5*10^{-3}$ mm$^3$ in the unground reaction product is more than 50%;
and/or
from 50 wt. % to 100 wt. % of the particles have a grain size of more than 106 μm, determined by sieve analysis according to ASTM B 214, and these particles consist of grown, monocrystalline grains;
and/or
the proportion of raspberries is advantageously less than 15% according to the invention.

A further specific embodiment of the invention relates to zirconium boride or titanium boride,
the proportion of crystals having a particle volume greater than $1.5*10^{-3}$ mm$^3$ in the unground reaction product is more than 50%;
or
from 50 wt. % to 100 wt. % of the particles have a grain size of more than 106 μm, determined by sieve analysis according to ASTM B 214, and these particles consist of grown, monocrystalline grains;
and/or the particle size distribution exhibits a $D_{10}$ value of from 20 μm to 250 μm, a $D_{50}$ value of from 40 μm to 400 μm and a $D_{90}$ value of from 80 μm to 750 μm.

A further specific embodiment of the invention relates to zirconium boride or titanium boride,
the proportion of crystals having a particle volume greater than $1.5*10^{-3}$ mm$^3$ in the unground reaction product is more than 50%;
or
from 50 wt. % to 100 wt. % of the particles have a grain size of more than 106 μm, determined by sieve analysis according to ASTM B 214, and these particles consist of grown, monocrystalline grains;
and/or
the particle size distribution exhibits a $D_{10}$ value of from 80 μm to 200 μm, a $D_{50}$ value of from 100 μm to 300 μm and a $D_{90}$ value of from 250 μm to 500 μm;
or
the particle size distribution exhibits a $D_{10}$ value of from 120 μm to 170 μm, a $D_{50}$ value of from 160 μm to 260 μm and a $D_{90}$ value of from 400 μm to 600 μm;
or
the particle size distribution exhibits a $D_{10}$ value of from 140 μm to 200 μm, a $D_{50}$ value of from 200 μm to 280 μm and a $D_{90}$ value of from 370 μm to 580 μm.

A further specific embodiment of the invention relates to zirconium boride or titanium boride,
the proportion of crystals having a particle volume greater than $1.5*10^{-3}$ mm$^3$ in the unground reaction product is more than 50%;
or
from 50 wt. % to 100 wt. % of the particles have a grain size of more than 106 μm, determined by sieve analysis according to ASTM B 214, and these particles consist of grown, monocrystalline grains;
and/or
the particle size distribution exhibits a $D_{10}$ value of from 80 μm to 200 μm, a $D_{50}$ value of from 100 μm to 300 μm and a $D_{90}$ value of from 250 μm to 500 μm;
or
the particle size distribution exhibits a $D_{10}$ value of from 120 μm to 170 μm, a $D_{50}$ value of from 160 μm to 260 μm and a $D_{90}$ value of from 400 μm to 600 μm;
or
the particle size distribution exhibits a $D_{10}$ value of from 140 μm to 200 μm, a $D_{50}$ value of from 200 μm to 280 μm and a $D_{90}$ value of from 370 μm to 580 μm,
and/or
the mean grain size, measured by laser diffraction on a Microtac X100, is between 200 and 355 μm.

A further specific embodiment of the invention relates to a process for the preparation of a boride of metals of transition group four by reacting boron carbide with at least one oxide of a metal of transition group four in the presence of carbon, wherein the reaction is carried out in the presence of an alkali or alkaline earth metal salt having a high boiling point of at least 1800° C., boron carbide is used in excess, and the reaction is carried out at a temperature of more than 2000° C., which process comprises the steps
  mixing boron carbide with at least one oxide of a metal of transition group four, with carbon and with an alkali or alkaline earth metal salt having a high boiling point of at least 1800° C.;
  heating the resulting mixture to a temperature above 2000° C.;
and/or
  maintaining the temperature for from 4 to 36 hours;
or
  maintaining the temperature for from 5 to 16 hours;
or
  maintaining the temperature for from 16 to 26 hours.

A further specific embodiment of the invention relates to a process for the preparation of a boride of metals of transition group four, comprising the steps
  mixing boron carbide with titanium dioxide or zirconium dioxide, with carbon black or coal dust and with lithium oxide, magnesium oxide, calcium oxide, calcium carbonate or calcium hydroxide;
  heating the resulting mixture to a temperature of from approximately 2100° C. to approximately 2750° C.;
or
  heating the resulting mixture to a temperature of approximately from 2200° C. to 2650° C.;
or heating the resulting mixture to a temperature of from approximately 2400° C. to approximately 2600° C.;
and/or
maintaining the temperature for from 4 to 36 hours;
or
maintaining the temperature for from 5 to 16 hours;
or
maintaining the temperature for from 16 to 26 hours.

A further specific embodiment of the invention relates to a process for the preparation of a boride of metals of transition group four, comprising the steps mixing boron carbide with titanium dioxide or zirconium dioxide having a BET surface area of from 0.1 $m^2/g$ to 8 $m^2/g$, with carbon black or coal dust and with lithium oxide, magnesium oxide, calcium oxide, calcium carbonate or calcium hydroxide in an amount of less than one wt. %;
or
from 0.025 wt. % to 0.25 wt. %;
heating the resulting mixture to a temperature of from approximately 2100° C. to approximately 2750° C.;
or
heating the resulting mixture to a temperature of approximately from 2200° C. to 2650° C.;
or
heating the resulting mixture to a temperature of from approximately 2400° C. to approximately 2600° C.;
and/or
maintaining the temperature for from 4 to 36 hours;
or
maintaining the temperature for from 5 to 16 hours;
or
maintaining the temperature for from 16 to 26 hours.

A further specific embodiment of the invention relates to a process for the preparation of a boride of metals of transition group four, comprising the steps mixing boron carbide with titanium dioxide or zirconium dioxide having a BET surface area of from 0.1 $m^2/g$ to 8 $m^2/g$, with carbon black or coal dust and with from 0.4 wt. % to 2.5 wt. % $B_2O_3$ or $B(OH)_3$ and also with lithium oxide, magnesium oxide, calcium oxide, calcium carbonate or calcium hydroxide in an amount of less than one wt. %;
or
from 0.025 wt. % to 0.25 wt. %;
heating the resulting mixture to a temperature of from approximately 2100° C. to approximately 2750° C.;
or
heating the resulting mixture to a temperature of from approximately 2200° C. to 2650° C.;
or
heating the resulting mixture to a temperature of from approximately 2400° C. to approximately 2600° C.;
and/or
maintaining the temperature for from 4 to 36 hours;
or
maintaining the temperature for from 5 to 16 hours;
or
maintaining the temperature for from 16 to 26 hours.

A further specific embodiment of the invention relates to a cermet obtained from a mixture comprising a zirconium boride or titanium boride,
wherein the proportion of crystals having a particle volume greater than $1.5*10^{-3}$ $mm^3$ in the unground reaction product is more than 50%;
or
from 50 wt. % to 100 wt. % of the particles have a grain size of more than 106 μm, determined by sieve analysis according to ASTM B 214, and these particles consist of grown, monocrystalline grains;
and
a metal binder comprising iron, copper, chromium, nickel, aluminium, yttrium, vanadium, rhenium or alloys thereof with one another or with other metals, which binder has a $D_{50}$ value of from 20 μm to 50 μm;
or
a metal binder comprising stainless steel, V4A steel, V2A steel, alloys known as MCrAlY or alloys marketed under the trade names Inconel® or Hastalloy®, which binder has a $D_{50}$ value of from 20 μm to 50 μm;
and
the ratio between the zirconium boride or titanium boride and the metal binder in the cermet is from 90:10 to 10:90.

EXAMPLES

The temperature measurement is carried out by measuring the temperature of the surface of the reaction mixture through the waste gas opening in the lid of the crucible using a pyrometer, an emission factor of from approximately 0.3 to approximately 0.5 being expedient. The described temperatures were measured at the surface of the reaction mixture using a pyrometer and with an emission factor of 0.37.

Comparison Example 1

Prior Art 750 g of $TiO_2$, 320 g of $B_4C$ and 120 g of carbon black are mixed intensively. The mixture is homogenised in an intensive mixer and transferred to a graphite crucible. The crucible is closed with a graphite lid having a hole. The reaction is heated to about 2200° C. with a heating capacity of about 40 KW in the medium frequency field.

Figure 1:
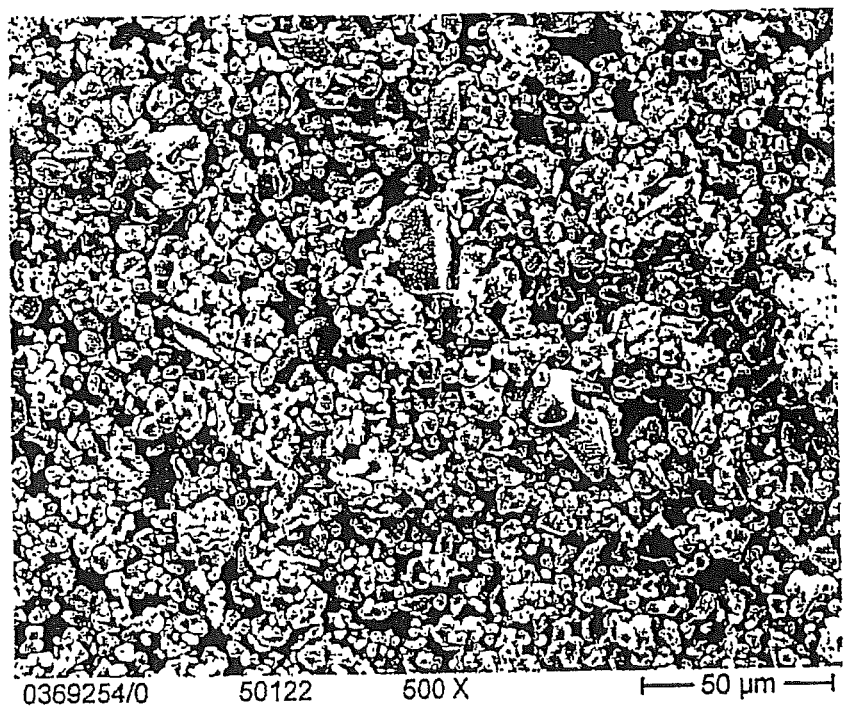
FIG. 1 is a scanning electron microscope photograph ("SEM") showing grains from Comparison Example 1.

After 24 hours, the reaction is complete. The resulting sintered block is worked up by breaking up, grinding and sieving. Approximately from 550 to 600 g of $TiB_2$ are obtained. The yield of grains>150 μm is 5.8%. All the grains of the fraction have a smooth surface as well as round corners and edges. However, the mean grain size of the powder is markedly below 50 μm. FIG. 1 shows grains of this product at 500 times magnification. The product has the following grain size distribution: $D_{10}$: 2.0 μm; $D_{50}$: 4.75 μm; $D_{90}$: 8.88 μm.

Comparison Example 2

Prior Art 250 g of $TiO_2$, 500 g of $H_3BO_3$ and 200 g of carbon black are mixed intensively. The mixture is homogenised in a mixer and transferred to a graphite crucible. The crucible is closed with a graphite lid having a hole. The reaction is heated to about 2200° C. with a heating capacity of from 35 to 40 KW in the medium frequency field.

After 16 to 20 hours, the reaction is complete. The resulting sintered block is worked up by breaking up, grinding and sieving. Approximately 218 g of $TiB_2$ are obtained. The yield in the case of the $B_2O_3$ route in a MF furnace is markedly lower and accordingly the specific costs are higher than with the $B_4C$ process. A fine product is obtained, the crystals of which are approximately from 1 to 5 μm in size.

Example 1

750 g of $TiO_2$, 320 g of $B_4C$ and 220 g of carbon black are mixed intensively. The mixture is homogenised in a mixer and transferred to a graphite crucible. The crucible is closed with a graphite lid having a hole. The reaction is heated to from approximately 2400 to 2500° C. (measured through the opening in the lid using a pyrometer) with the increased heating capacity of from 45 to 50 KW in the medium frequency field.

After 18 to 22 hours, the reaction is complete. The resulting sintered block is worked up by breaking up, grinding and sieving. From 550 to 600 g of $TiB_2$ are obtained. It is noticeable that more than half of the coarse particles consist of raspberry-like agglomerated primary grains. The size of the fine primary grains is in the range of from approximately 2 to 30 μm. The grown monocrystalline grains of the coarse fraction exhibit smooth surfaces and rounded corners and edges. FIG. 2 shows grains and raspberries of this product at 20 times magnification. The product has the following grain size distribution: 53.8 wt. %<106 μm; 33.8 wt. % 106-250 μm; 12.4 wt. %>250 μm.

Example 2

750 g of $TiO_2$, 320 g of $B_4C$ and 220 g of carbon black and 1 g of CaO are mixed intensively. The mixture is homogenised in a mixer and transferred to a graphite crucible. The crucible is closed with a graphite lid having a hole. The reaction is heated to from approximately 2400 to 2500° C. (measured through the opening in the lid using a pyrometer) with the increased heating capacity of about 50 KW in the medium frequency field.

Figure 3:
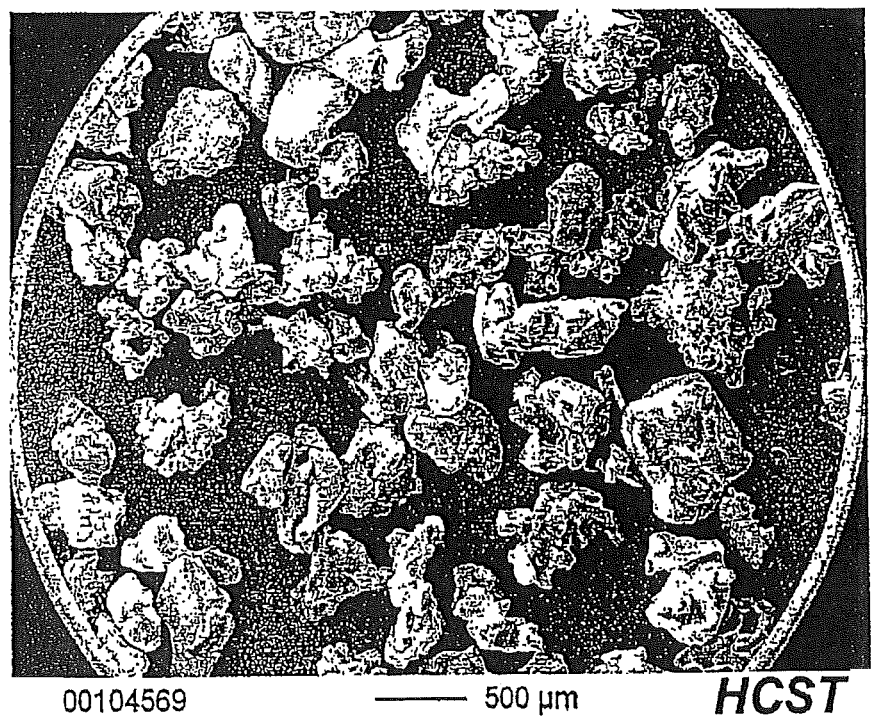
FIG. 3 is an SEM showing grains from Example 2.

After 21 to 24 hours, the reaction is complete. The resulting sintered block is worked up by breaking up, grinding and sieving. From approximately 550 to 600 g of $TiB_2$ are obtained. The yield of grains>106 μm is 84.6%. The calcium content of the product was 38 ppm. The yield of grains 106-800 μm in the total mass is 73.4%. It is noticeable that almost none of the coarse particles consist of raspberry-like agglomerated fine primary grains, but almost all are monocrystalline grains having smooth surfaces and rounded corners and edges. Grains of the 200-800 μm fraction are shown in FIG. 3. The product has the following grain size distribution: 13.4 wt. %<106 μm; 30.2 wt. % 106-250 μm; 56.4 wt. %>250 μm.

Example 3

750 g of $TiO_2$, 320 g of $B_4C$ and 220 g of carbon black and 0.5 g of CaO are mixed intensively. The mixture is homogenised in a mixer and transferred to a graphite crucible. The crucible is closed with a graphite lid having a hole. The reaction is heated to from approximately 2400 to 2500° C. (measured through the opening in the lid using a pyrometer) with the increased heating capacity of about 50 KW in the medium frequency field.

After 16 to 21 hours, the reaction is complete. The resulting sintered block is worked up by breaking up, grinding and sieving. From approximately 560 to 600 g of $TiB_2$ are obtained. The yield of grains>250 μm is 52.4%. The yield of grains 106-800 μm in the total mass is 67.8%. It is noticeable that almost none of the coarse particles consist of raspberry-like agglomerated fine primary grains, but almost all are monocrystalline grains with smooth surfaces and rounded corners and edges. Grains of the 106-800 μm fraction are shown in FIG. 4. The glossy, smooth surface and the round corners and edges are very clearly visible. The product has the following grain size distribution, measured by laser diffraction using a Microtrac X100: $D_n$: 116 μm; $D_{50}$: 262 μm; $D_{90}$: 483 μm.

Example

Cermets from Borides of Metals of Transition Group Four and Steel Powder

Cermet platelets on which wear resistance studies can be carried out are produced by, for example, coarse borides being sintered with metallic binders. Fine boride particles can be added in addition. These fine particles fill packing gaps between the coarse boride particles and thereby increase the total content of wear-resistant constituents in the final cermet. Cermets of this kind are also described in the patent specification WO2004/104242.

The cermets were produced from borides according to the invention by 1:1:1 mixtures of atomized stainless steel 1.4767 (Ampersint® 0559, $D_{50}$=32 μm, H.C. Starck GmbH), fine titanium boride (Grade D, Los 50559, $D_{50}$=15.3 μm, H.C. Starck GmbH) and the titanium boride reported in Table 1 being sintered under pressure. The mixture compositions are recited below. Each of the four mixtures is sintered in a graphite matrix in a hot press at 250 kp/cm² and 1250° C. under argon to form round cermet discs about 5 mm in thickness. Table 1 gives an overview of the powder mixtures used for producing the cermet platelets and of the resulting cermets.

The round discs obtained by hot pressing are cut with a high-pressure water jet saw using the abrasive cutting process (450 g/min Indian granite, 80 mesh) at a pressure of 3500 bar, nozzle diameter 0.3 mm, forward feed speed 20-25 ram/min, into rectangular platelets 50*25 mm² in size. It emerged that the platelets of the cermet of Example 5 could not be cut through under these conditions even at a reduced forward feed speed of 15 mm/min. This cermet was therefore cut using a diamond severing disc.

The rectangular platelets are subjected to a wear test on a friction roller test rig in accordance with the ASTM G65 A standard, where abrasion of the cermet platelets is determined in terms of milligrams of weight lost.

The results are shown in Table 1.

TABLE 1

| Example | Titanium boride | Image of cermet | Weight loss in ASTM G65A [mg] |
|---|---|---|---|
| 4 | Example 1 | | 14.4 |
| 5 | Example 3 | 6 | 11.9 |
| Comparison 3 | HCST Grade D, Los 50923, $D_{50}$ = 4.7 μm | | 19.3 |
| Comparison 4 | ESK, Kempten, Grade M9 | 7 | 25.9 |

Comparison Example 4 utilizes a commercially available, coarse, molten titanium boride in accordance with the prior art (ESK, Kempten, Grade M9).

Comparison Example 3 utilizes a commercially available fine titanium boride according to the prior art (H.C. Starck GmbH, Goslar, Grade D, $D_{50}$=4.7 μm).

It emerges that the cermet according to Example 5 (containing titanium boride in accordance with Example 3 of the invention) has the least abrasion. Cutting with the water jet showed straightaway that the cermet according to Example 5 is extremely resistant. The disc could not be cut using the water jet. A diamond saw had to be used.

FIGS. 6 and 7 show the surfaces of the hot-pressed cermets according to Example 5 and Comparison Example 4. Cermets Produced with Titanium Boride according to the invention are seen to have a particularly large fraction of surviving coarse TiB$_2$ crystals. Although the unsintered powder mixture of the comparative cermet platelet in accordance with Comparison Example 4 (FIG. 7) likewise contains a third of coarse titanium boride, the hot-pressed sample is found to contain distinctly fewer of these particularly wear-resistant particles. One explanation is that the molten, coarse titanium boride has a rough surface which, at the elevated temperatures of the sintering operation, is particularly ready to react with metals. As a result, the originally coarse crystals are partially or completely broken up and are no longer available for wear protection.

In contrast, the extremely smooth surface of the titanium borides according to the invention, particularly in the embodiment as per Example 3, offers an aggressive metal matrix only very little area to attack during sintering or hot pressing.

The invention claimed is:

1. A boride powder of a metal of transition group four of the periodic table of the elements which comprises particles, wherein at least 40 wt. % of the particles have a grain size of more than 106 μm, determined by sieve analysis according to ASTM B 214, and these particles consist of grown, monocrystalline grains and wherein the monocrystalline grains have a glossy, smooth surface and round corners and edges.

2. The boride according to claim 1, wherein the metal of transition group four of the periodic table is a metal selected from the group consisting of titanium, zirconium, hafnium and mixtures thereof.

3. The boride according to claim 1 which is a titanium boride, zirconium boride or a mixed crystal comprising at least one of these borides.

4. The boride according to claim 1, wherein the mean grain size of the sieve analysis according to ASTM B 214 is between 100 and 500 μm.

5. The boride according to claim 1, wherein the mean grain size of the sieve analysis according to ROTAP ASTM B 214 is between 200 and 355 μm.

6. The boride according to claim 1, wherein the fraction thereof >106 μM exhibits less than 10% particles consisting of raspberry-like agglomerated fine primary crystals having a size of from 2 to 30 μm.

7. The boride according to claim 1 having a content of alkali or alkaline earth metal of less than 100 ppm.

8. The boride according to claim 1, wherein 60 wt % to 70 wt % of the particles have a grain size of more than 106 μM, determined by sieve analysis according to ASTM B 214.

9. A boride powder of a metal of transition group four of the periodic table of the elements which comprises particles, wherein at least 40 wt. % of the particles have a grain size of more than 106 μm, determined by sieve analysis according to ASTM B 214, and these particles consist of grown, monocrystalline grains and wherein the fraction thereof >106 μm exhibits less than 10% particles consisting of raspberry-like agglomerated fine primary crystals having a size of from 2 to 30 μm.

10. A process for the preparation of boride according to claim 1, by reacting boron carbide with at least one oxide of a metal of transition group four in the presence of carbon, which comprises carrying out the reaction in the presence of an alkali or alkaline earth metal salt having a high boiling point of at least 1800° C., boron carbide is used in excess, and the reaction is carried out at a temperature of more than 2000° C.

11. The process according to claim 10, wherein the temperature is from 2100° C. to 2750° C.

12. The process according to claim 10, wherein the alkali or alkaline earth metal salt used is at least one oxide, hydroxide or carbonate.

13. The process according to claim 12, wherein the alkali or alkaline earth metal salt used is a salt selected from the group consisting of lithium oxide, magnesium oxide, calcium oxide, calcium hydroxide and calcium carbonate.

14. The process according to claim 10, wherein the reaction is additionally carried out in the presence of B$_2$O$_3$.

15. The process according to claim 10, wherein the alkali or alkaline earth metal salt is added in an amount of not more than one percent by weight of the reaction mixture.

16. The process according to claim 10, wherein the calcium content of the reaction mixture is from 0.03 to 0.1 wt. %.

17. A process to manufacture a cermet which comprises hot pressing, high-temperature isostatic pressing, low-temperature isostatic pressing/sintering or free sintering the boride according to claim 1 in admixture with a metal binder component.

18. A process for producing a wettable powder for surface coating by plasma spraying, HVOF or cold gas spraying, which comprises bonding the titanium boride according claim 3 to a surface in the form of a ceramics hard material in a metal binder component and, owing to its smooth crystal surface and its round corners and edges, brings about frictional, sliding and wear properties of the coating.

19. A surface coating comprising the boride according to claim 1.

20. Cermet comprising the boride according to claim 1.

21. The cermet according to claim 20, further comprising as metal binder component iron, copper, steel, stainless steel, MCrAlY, superalloys, Inconel, Hastalloy, V4A steel, or V2A steel.

22. A wettable powder comprising the boride according to claim 1 and at least one metal powder as binder component.

* * * * *